(12) United States Patent
Pinnick et al.

(10) Patent No.: US 10,203,115 B2
(45) Date of Patent: Feb. 12, 2019

(54) GAS TURBINE ENGINE VARIABLE POROSITY COMBUSTOR LINER

(71) Applicants: Rolls-Royce Corporation, Indianapolis, IN (US); Rolls-Royce North American Technologies, Inc., Indianapolis, IN (US)

(72) Inventors: Donald E. Pinnick, Mooresville, IN (US); Kenneth W. Froemming, Carmel, IN (US); Bruce E. Varney, Greenwood, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 0 days.

(21) Appl. No.: 15/627,843

(22) Filed: Jun. 20, 2017

(65) Prior Publication Data

US 2017/0292703 A1    Oct. 12, 2017

Related U.S. Application Data

(63) Continuation of application No. 14/136,705, filed on Dec. 20, 2013, now Pat. No. 9,719,684.

(Continued)

(51) Int. Cl.
*F23R 3/06* (2006.01)
*F23R 3/00* (2006.01)

(52) U.S. Cl.
CPC ............. *F23R 3/002* (2013.01); *F23R 3/005* (2013.01); *F23R 3/06* (2013.01);
(Continued)

(58) Field of Classification Search
CPC ...... F23R 3/02; F23R 3/04; F23R 3/06; F23R 3/10; F23R 3/10; F23R 3/002
See application file for complete search history.

(56) References Cited

U.S. PATENT DOCUMENTS 2,974,485 A * 3/1961 Schiefer ................. F23C 99/00
                                                          60/756
3,584,972 A    6/1971 Bratkovich et al.
(Continued)

FOREIGN PATENT DOCUMENTS

GB        1545783 A    5/1979

OTHER PUBLICATIONS

International Search Report for PCT/US2013/070287 dated Jan. 31, 2014.

*Primary Examiner* — William H Rodriguez
(74) *Attorney, Agent, or Firm* — Fishman Stewart PLLC

(57) ABSTRACT

A gas turbine engine variable porosity combustor liner has a laminated alloy structure. The laminated alloy structure has combustion chamber facing holes on one side and cooling plenum facing holes on a radially opposite side. The combustion chamber facing holes are in fluid communication with the cooling plenum facing holes via axially and circumferentially extending flow passages sandwiched between metal alloy sheets of the laminated alloy structure. Porous zones having respective different cooling flow amounts are formed in the laminated alloy structure based on at least one of an arrangement of the combustion chamber facing holes, an arrangement of the cooling plenum facing holes, and an arrangement of the flow passages.

10 Claims, 5 Drawing Sheets

Related U.S. Application Data

(60) Provisional application No. 61/799,557, filed on Mar. 15, 2013.

(52) U.S. Cl.
CPC ............... *F23R 2900/03041* (2013.01); *F23R 2900/03042* (2013.01); *F23R 2900/03043* (2013.01); *F23R 2900/03044* (2013.01); *Y02T 50/675* (2013.01); *Y10T 29/49229* (2015.01)

(56) References Cited

U.S. PATENT DOCUMENTS

| | | | | |
|---|---|---|---|---|
| 3,594,109 | A * | 7/1971 | Penny | F01D 25/005 |
| | | | | 60/800 |
| RE29,524 | E | 1/1978 | Spencer | |
| 4,315,406 | A | 2/1982 | Bhangu et al. | |
| 4,695,247 | A * | 9/1987 | Enzaki | F23R 3/002 |
| | | | | 431/351 |
| 4,751,962 | A | 6/1988 | Havekost et al. | |
| 4,872,312 | A | 10/1989 | Iizuka et al. | |
| 6,145,319 | A | 11/2000 | Burns et al. | |
| 6,265,961 | B1 | 7/2001 | Takeda | |
| 6,513,331 | B1 * | 2/2003 | Brown | F23R 3/06 |
| | | | | 60/754 |
| 7,036,316 | B2 | 5/2006 | Howell et al. | |
| 7,216,485 | B2 | 5/2007 | Caldwell et al. | |
| 7,631,502 | B2 | 12/2009 | Burd et al. | |
| 7,942,006 | B2 | 5/2011 | Critchley et al. | |
| 7,954,326 | B2 | 6/2011 | Lai et al. | |
| 2003/0027093 | A1 * | 2/2003 | Kutter | F23M 5/085 |
| | | | | 431/353 |
| 2007/0084219 | A1 * | 4/2007 | Bernier | F23R 3/002 |
| | | | | 60/804 |
| 2008/0010992 | A1 | 1/2008 | Patterson et al. | |
| 2009/0013695 | A1 | 1/2009 | Dierberger et al. | |
| 2010/0077763 | A1 | 4/2010 | Alkabie | |
| 2010/0218503 | A1 * | 9/2010 | Bronson | F23R 3/06 |
| | | | | 60/754 |
| 2012/0204727 | A1 | 8/2012 | Nordlund | |
| 2013/0025293 | A1 | 1/2013 | Kim et al. | |

\* cited by examiner

US 10,203,115 B2

GAS TURBINE ENGINE VARIABLE POROSITY COMBUSTOR LINER

CROSS-REFERENCE TO RELATED APPLICATIONS

This application is a continuation of U.S. patent application Ser. No. 14/136,705, filed Dec. 20, 2013, which claims priority to U.S. Provisional Patent Application No. 61/799,557 filed Mar. 15, 2013, the contents of which are hereby incorporated in their entirety.

TECHNICAL FIELD

The present application relates to gas turbine engine combustor liners, and more particularly, but not exclusively, to gas turbine engine combustor liners having variable porosity regions.

BACKGROUND

Combustor liners for gas turbine engines, and the structure and manner for cooling such combustor liners, remains an area of interest. Some existing systems and methods have various shortcomings, drawbacks, and disadvantages relative to certain applications. Accordingly, there remains a need for further contributions in this area of technology.

SUMMARY

One embodiment of the present invention is a unique variable porosity combustor liner in which porous zones having respective different cooling flow amounts are formed in the combustor liner structure based on an arrangement of the cooling flow holes and cooling flow passages in the walls of the combustor liner. Other embodiments include apparatuses, systems, devices, hardware, methods, and combinations for providing porous regions having different porosity in the combustor liner. Further embodiments, forms, features, aspects, benefits, and advantages of the present application shall become apparent from the description and figures provided herewith.

BRIEF DESCRIPTION OF THE DRAWINGS

Features of the application will be better understood from the following detailed description when considered in reference to the accompanying drawings, in which.

DETAILED DESCRIPTION

Figure 1:
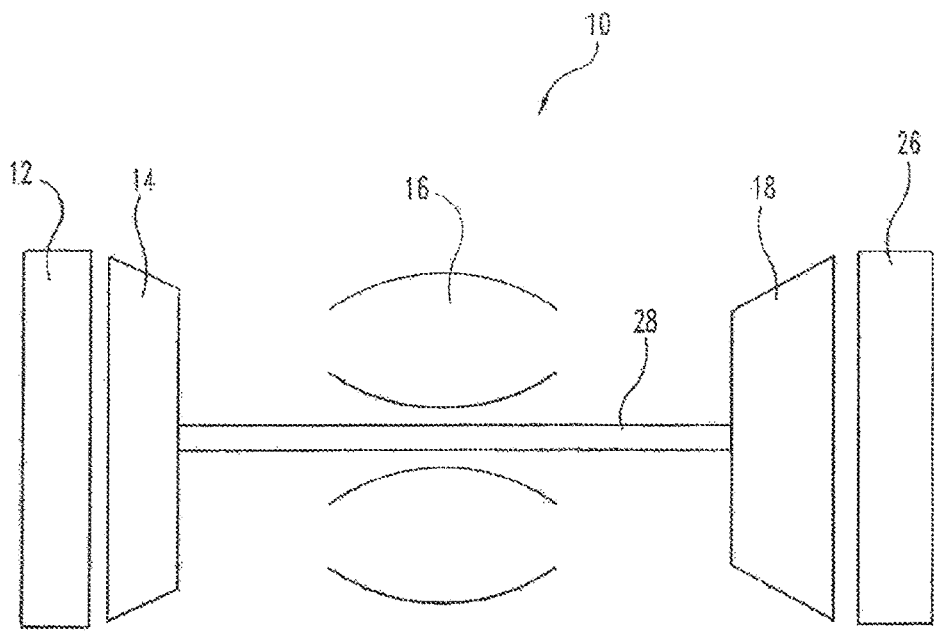
FIG. 1 is a diagram showing the major sections of a gas turbine engine according to an embodiment.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein, are contemplated as would normally occur to one skilled in the art to which the invention relates.

With reference to FIG. 1, there is illustrated a schematic representation of one form of an aircraft gas turbine engine 10 used as a powerplant for an aircraft. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the inventions described herein are contemplated for utilization in other applications that may not be coupled with an aircraft such as, for example, industrial applications, power generation, pumping sets, naval propulsion and other applications known to one of ordinary skill in the art.

The gas turbine engine 10 includes an intake section 12, a compressor section 14, a combustion section 16, a turbine section 18, and an exhaust nozzle 26. The as-shown gas turbine engine 10 comprises a single spool engine. It will be appreciated that the gas turbine engine 10 is not limited to the configuration shown in FIG. 1, and other embodiments are contemplated. For example, the gas turbine engine 10 can comprise a multi-spool engine, a low or high bypass ratio (BPR) engine, among others. In other embodiments, the gas turbine engine 10 may have other configurations suited to the particular application of the aircraft.

In operation, the compressor section 14 compresses air received from the intake section 12 of the gas turbine engine 10, and the compressed air that is exhausted from the compressor section 14 is directed into the combustion section 16. The combustion section 16 mixes the compressed air with fuel and the fuel/air mixture is combusted to generate hot combustion products, which expand through, and thereby drive, the turbine section 18. The turbine section 18, in turn, drives the compressor section 14 by an interconnecting shaft 28. Downstream of the turbine section 18, the stream of hot combustion products is exhausted through the exhaust nozzle 26 to provide propulsive thrust. As will be described in greater detail below, the combustion section 16 has a variable porosity laminated alloy combustor liner 30 that serves to contain the hot combustion products and provide cooling effects that vary based on the porosity, or amount of cooling flow, of respective regions of the laminated alloy combustor liner 30.

Figure 2:
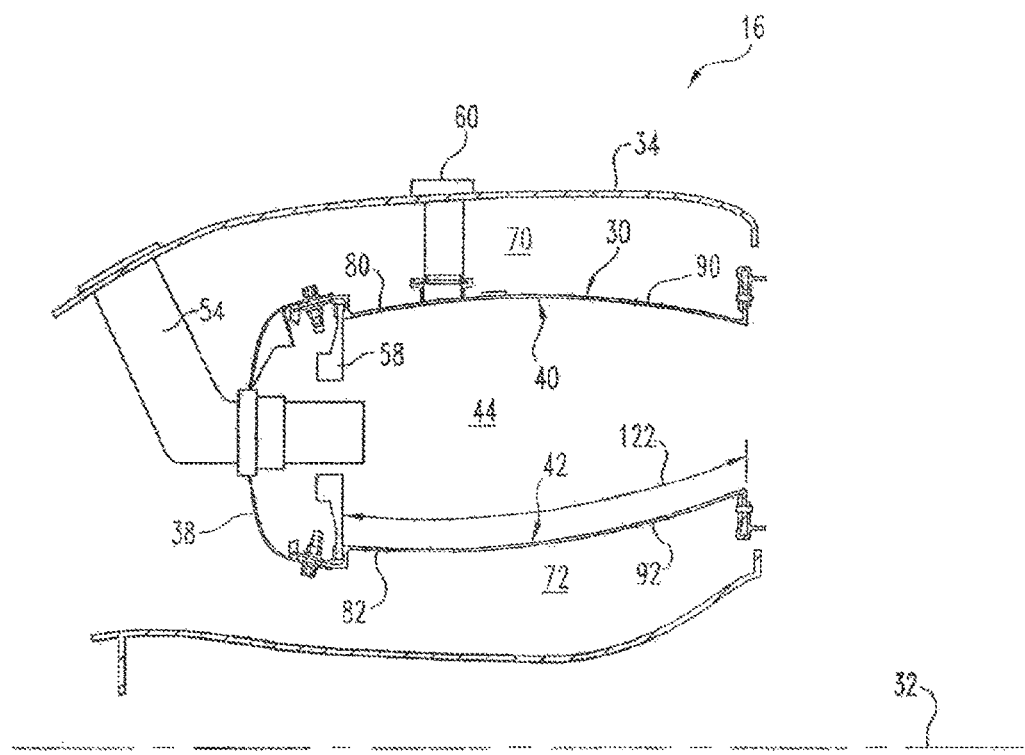
FIG. 2 is a diagram showing a combustion section of the FIG. 1 gas turbine engine according to an embodiment.

FIG. 2 shows a combustion section 16 according to an embodiment in greater detail. The combustion section 16 is of the annular type and is disposed about the axis 32 of the gas turbine engine 10. Although the illustrative combustion section 16 is of the annular combustor type, the combustion section 16 is not limited as such and other embodiments are contemplated. For example, the combustion section 16 can comprise a multi can combustor type, a can annular combustor type, or other suitable combustor configuration.

The combustion section 16 includes the variable porosity laminated alloy combustor liner 30, a casing 34 surrounding the combustor liner 30, and a dome inlet module 38 connected to the combustor liner 30 at its upstream end. The combustor liner 30 includes an outer variable porosity laminated alloy barrel, or liner, 40, and an inner variable porosity laminated alloy barrel, or liner, 42, between which is defined an annular combustion chamber 44. The illustrative combustion section 16 also includes a fuel injector assembly 54, a swirler assembly 58, and an igniter assembly 60. In operation, the swirler assembly 58 and the dome inlet module 38 generate turbulence in the compressed air from the compressor section 14, the compressed air is mixed with fuel from the fuel injector assembly 54 in the combustion chamber 44, and the fuel/air mixture is combusted in the combustion chamber 44 by the igniter assembly 60, thus producing the hot combustion products that drive the downstream turbine section 18 (FIG. 1). The combustion section 16 can include additional and/or alternative components to those described with respect to the illustrative embodiment, and their configuration can be different depending on the particular engine type and parameters, as would occur to those skilled in the art.

The casing 34 and the outer variable porosity combustor liner 40 define a radially outer passage 70 there between, also referred to herein as an outer bypass flow passage 70. The casing 34 and the inner variable porosity combustor liner 42 define a radially inner passage 72 there between, also referred to herein as an inner bypass flow passage 72. Upstream of the combustion section 16 is disposed a not-shown diffuser, which directs the compressed air from the compressor section 14 to the upstream end of the dome inlet module 38 and into the outer and inner bypass flow passages 70, 72.

Fluid flow holes, or passages, can be provided through the thickness of the dome inlet module 38 and the outer and inner variable porosity combustor liners 40, 42, to communicate compressed air from the upstream end of the dome inlet module 38 and the outer and inner bypass flow passages 70, 72, to the inside of the combustion chamber 44. In one form, for example, the holes or passages can include one or more axially spaced rows of primary holes 80, 82 to communicate air from the respective outer and inner bypass flow passages 70, 72 to the fuel/air mixture at the upstream portion of the variable porosity combustor liner 30. In another or additional form, the fluid flow holes can include one or more axially spaced rows of dilution holes 90, 92 to communicate dilution air from the respective outer and inner bypass flow passages 70, 72 to the inside of the combustion chamber 44 at the downstream portion of the variable porosity combustor liner 30.

Turning now to FIGS. 3 through 8, there are shown several views of a porous region of the inner variable porosity laminated alloy combustor liner 42 of the combustor liner 30 according to an embodiment. The description that follows describes the porous region with respect to the inner combustor liner 42, and those skilled in the art will appreciate that the description is also, or alternatively, applicable to the outer variable porosity laminated alloy combustor liner 40. For this reason, and for purposes of brevity, description of a porous region(s) with respect to the outer combustor liner 40 is omitted.

Figure 3:
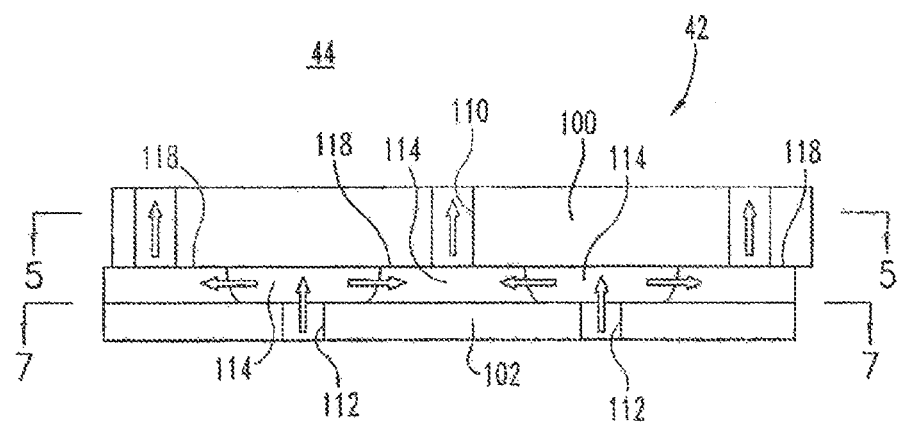
FIG. 3 is an enlarged cross-sectional view of the FIG. 2 combustion section taken along the line 3-3 in FIG. 2, showing a porous portion of an inner variable porosity laminated alloy combustor liner according to an embodiment.
Figure 4:
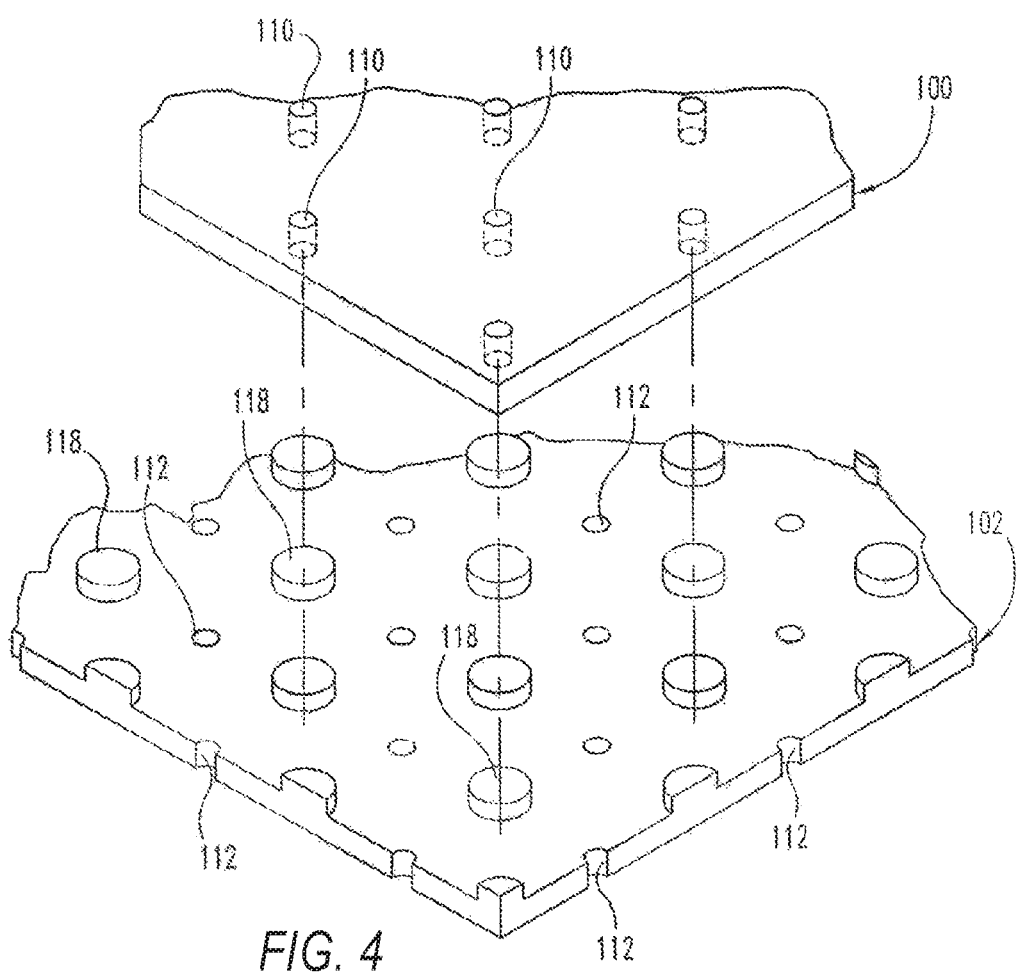
FIG. 4 is an exploded view of inner and outer walls of the FIG. 3 porous portion of the inner variable porosity laminated alloy combustor liner.

The inner combustor liner 42 comprises a variable porosity laminated alloy configuration, also referred to herein as a variable porosity Lamilloy configuration, a variable porosity configuration, and a laminated alloy configuration. As shown in FIGS. 3 and 4, the inner combustor liner 42 includes inner and outer sheets, or walls 100, 102, also referred to herein as hot side and cold side walls 100, 102. Each wall 100, 102 is fabricated from flat metal alloy sheet material, also referred to herein as Lamilloy sheet material, and incorporates its own configuration of holes and/or passages, which are described in greater detail below. The inner sheet 100 and outer sheet 102 are diffusion bonded together to form a two ply sheet laminated alloy combustor liner 42. The configurations of multiple holes and/or passages in the walls 100, 102 together define multiple different porous regions in the inner Lamilloy combustor liner 42 that provide respective porosities, or fluid flow amounts, through the walls 100, 102 at the respective porous regions. The multiple different porous regions, as described in greater detail below with respect to FIGS. 9-12, can have multiple respective configurations corresponding to multiple respective different cooling flow amounts, or other flow characteristics, tailored to cool respective different zones of cooling requirements in the combustor liner 30.

FIGS. 3 and 4 show a porous region of the inner variable porosity Lamilloy combustor liner 42 according to an embodiment. The inner sheet or wall 100 has a plurality of hot side holes 110 projecting through the thickness of the inner wall 100. The outer sheet or wall 102 has a plurality of cold side holes 112 projecting through the thickness of the outer wall 102. As shown in FIG. 3, the hot side holes 110 are in fluid communication with the combustion chamber 44 and the cold side holes 112 are in fluid communication with the inner bypass flow passage 72. The inner and outer sheets 100, 102 define flow passages 114 there between, and the cold side holes 112 are in fluid communication with the hot side holes 110 via the flow passages 114. In operation, cooling air in the form of compressed air from the compression section 14 passes through the porous region as it is routed from the inner bypass flow passage 72 to the combustion chamber 44 via the cold side holes 112, the flow passages 114, and the hot side holes 110. As cooling air circulates through the flow passages 114 and into the combustion chamber 44, the air serves to internally cool the walls 100, 102 and to provide a cool film of air on the interior of the inner wall 100 to prevent or inhibit hot combustion products inside the combustion chamber 44 from significantly heating the inner combustor liner 42, and thus the combustor liner 30.

Figure 5:
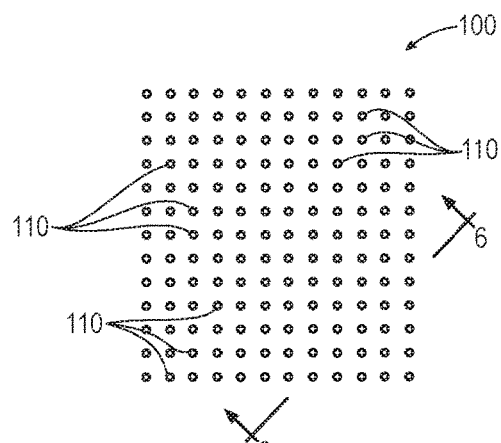
FIG. 5 is a radially inward view of an inner wall of the FIG. 3 inner variable porosity laminated alloy combustor liner, taken along the line 5-5 in FIG. 3, and flattened out for clarity.
Figure 6:
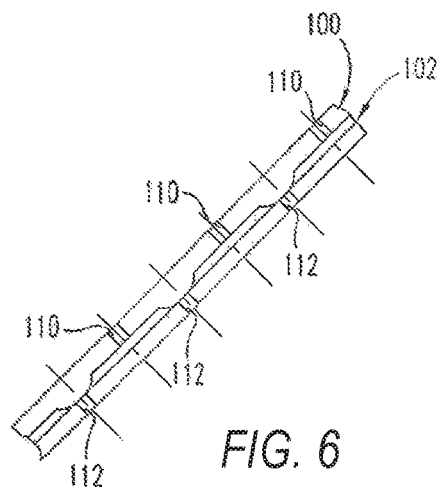
FIG. 6 is a cross-sectional view of the inner wall of the FIG. 5 inner variable porosity laminated alloy combustor liner, taken along the line 6-6 in FIG. 5, and additionally showing in cross-section the outer wall of the combustor liner disposed radially outward of the inner wall.
Figure 7:
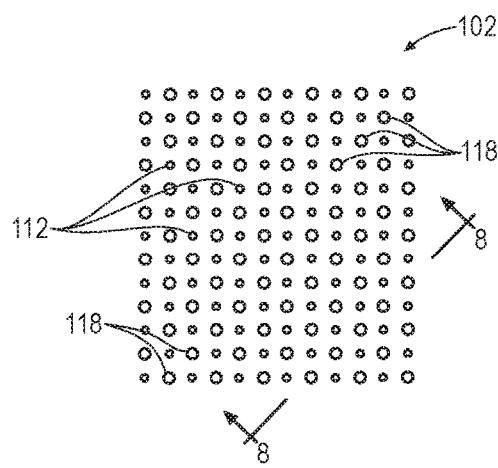
FIG. 7 is a radially inward view of an outer wall of the FIG. 3 inner variable porosity laminated alloy combustor liner, taken along the line 7-7 in FIG. 3, and flattened out for clarity.
Figure 8:
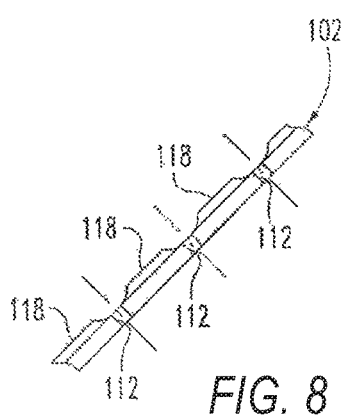
FIG. 8 is a cross-sectional view of the outer wall of the FIG. 7 inner variable porosity laminated alloy combustor liner, taken along the line 8-8 in FIG. 7.

FIGS. 5 through 8 show the porous region of the embodiment of FIGS. 3 and 4 in greater detail. As shown in FIG. 5, the hot side holes 110 of the hot side wall 100 are circular, have the same size, and are distributed in the porous region in an array fashion. As shown in FIG. 6, the hot side holes 110 extend through the thickness of the hot side wall 100 in a linear manner and terminate at their radially outer end at the surface (or plane or tangent) of the cold side wall 102, where the hot side holes 110 open into the flow passages 114 (FIG. 3) of the cold side wall 102. As shown in FIG. 7, the cold side holes 112 of the cold side wall 102 are circular, have the same size, and are distributed in the porous region in an array fashion. In addition, the cold side wall 102 includes a plurality of pedestals 118 distributed in the porous region in an array fashion such that the pedestals 118 are in alternating relation with respect to the cold side holes 112 in the axial and circumferential directions. The pedestals 118 have a circular shape and define there between the flow passages 114 shown in FIG. 3. As shown in FIG. 8, the pedestals 118 have a height of approximately 40-50% of the total thickness of the cold side wall 102. Further, the cold side holes 112, which are disposed between pedestals 118, extend through the thickness of the cold side wall 102 in a linear manner. In the porous region of the embodiment of FIGS. 3 and 4, the array of hot side holes 110 is offset from the array of cold side holes 112 in the axial and circumferential directions, as shown in FIG. 6.

The size and configuration of the holes and passages in the porous region of the embodiment of FIGS. 3-8 will produce a certain porosity, or cooling flow amount, or other fluid characteristics, through the porous region tailored to a cooling requirement at that region of the inner combustor liner 42 and, accordingly, that of the combustor liner 30. As will be appreciated, the size and configuration need not be limited to that of FIGS. 3-8, and will be based on the particular cooling requirements of the combustor liner 30 and the operating conditions of the combustion section 16 and the gas turbine engine 10. Accordingly, other embodiments having other sizes and configurations for holes and passages in the multiple layer laminated alloy structure may be suitable for a particular application.

For example, although the hot side and cold side holes 110, 112 are shown in FIGS. 3-8 to project through the thicknesses of the respective walls 100, 102 in a linear manner, resulting in a certain amount of cooling flow through the porous region, the holes 110, 112 need not be limited to such configuration and can take on a configuration resulting in a different amount of cooling flow, or porosity, through the porous region.

The holes 110, 112 are illustrated as having a circular shape in radial direction view. It will be appreciated that the holes 110, 112 can have any suitable shape for realizing a desired amount of fluid flow or porosity through a particular porous region tailored to a cooling requirement of the combustor liner 30, or tailored to a particular characteristic of fluid flow. The holes 110, 112 need not be the same size, as illustrated, and can vary in size between hot side holes 110 and cold side holes 112, or among the hot side holes 110 and/or among the cold side holes 112. Further, the holes 110, 112 need not be distributed in an array fashion in the porous region, as illustrated, and instead can be distributed in an uneven manner across the porous region, either in the hot side wall 100 or the cold side wall 102, or both walls 100, 102.

In FIGS. 4, 6, and 8, the pedestals 118 are shown to be the same size and shape, and to be distributed in an array fashion, resulting in a certain cooling flow or porosity in the porous region for a particular cooling requirement. In one form, the pedestals 118 can vary in size and/or shape within the porous region to obtain a desired amount of cooling flow or porosity through the porous region. In another or additional form, the pedestals 118 can be distributed in an uneven manner across the porous region in order to tailor a desired porosity. The pedestals 118 are shown in FIG. 7 to be disposed in alternating relation with respect to the cold side holes 112 in the axial and circumferential directions to bring about a desired amount of cooling flow for a particular cooling requirement of the combustor liner 30. In another form, the pedestals 118 can be disposed in alternating relation with respect to the cold side holes 112 in the axial direction. In another form, the pedestals 118 can be disposed in alternating relation with respect to the cold side holes 112 in the circumferential direction to obtain a tailored amount of cooling flow. The height of the pedestals 118 of the embodiment of FIGS. 3-8 is the same across the porous region, but need not be limited as such. The pedestals 118 can have different heights within the same porous region depending on the desired amount of fluid flow through the porous region.

As shown in FIGS. 5-7, the hot side holes 110 are offset from the cold side holes 112 in the axial direction and the circumferential direction. The present application need not be limited to such configuration, and other embodiments are contemplated. In one form, for example, the hot side holes 110 can be offset from the cold side holes 112 in the axial direction without offset in the circumferential direction. In another form, the hot side holes 110 can be offset from the cold side holes 112 in the circumferential direction without offset in the axial direction. In the illustrated embodiment, the offset is equal in the axial and circumferential directions. In another form, the offset can be different in the axial and circumferential directions.

As will be apparent to those skilled in the art, the amount of cooling flow provided by a porous region can be tailored to satisfy a particular cooling requirement of a region of the variable porosity Lamilloy combustor liner 30, for example as described with respect to the embodiment of FIGS. 3-8, and can vary depending on the size and configuration of the holes and flow passages in the metal alloy sheets 100, 102 that form the combustor liner 30. The cooling flow amount, or porosity, can be tailored at different zones or regions of the laminated alloy combustor liner 30, in the inner Lamilloy combustor liner 42 and/or the outer Lamilloy combustor liner 40, according to the cooling requirements of the respective particular zones or regions.

Figure 9:
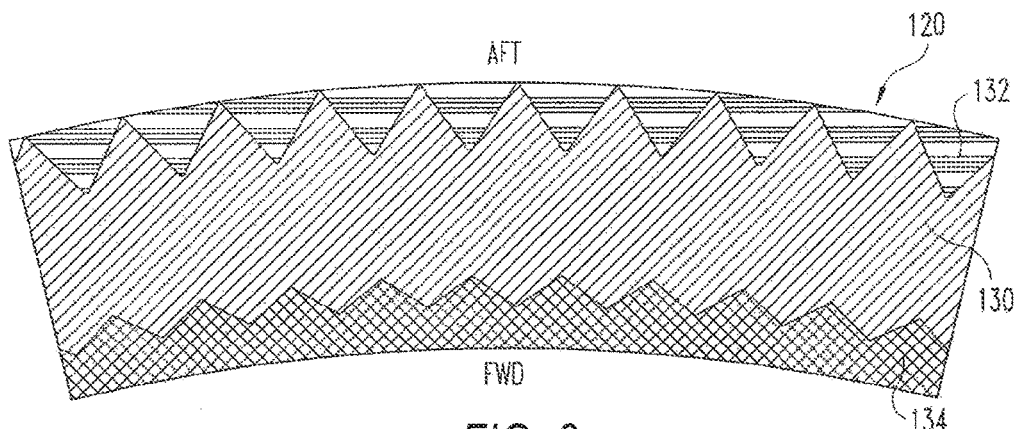
FIG. 9 is an arc portion of an inner variable porosity laminated alloy combustor liner according to an embodiment, showing zones having respective porosities.
Figure 11:
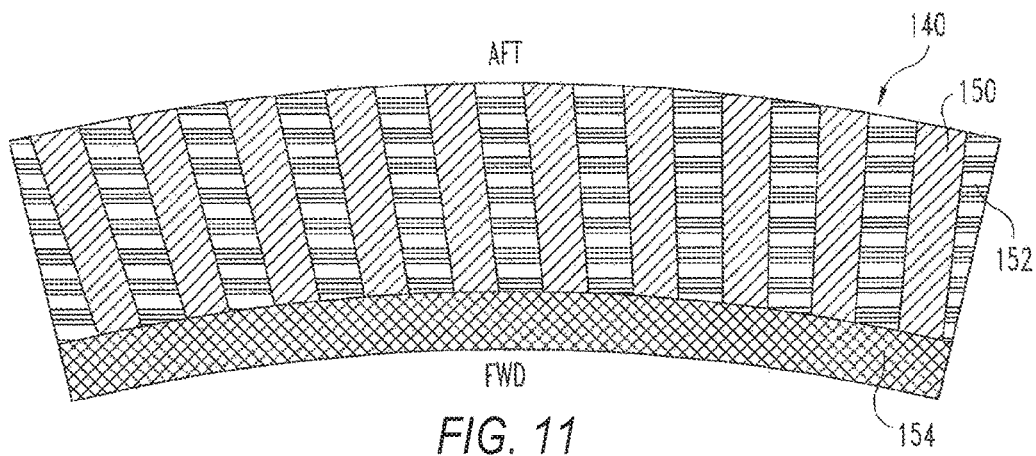
FIG. 11 is an arc portion of an inner variable porosity laminated alloy combustor liner according to another embodiment, showing zones having respective porosities.

FIGS. 9 and 11 illustrate two different embodiments of an arc portion of an inner variable porosity Lamilloy combustor liner 120, 140. Each arc portion has inner and outer sheets, or walls, 100, 102, that, based on the size and configuration of holes and flow passages therein, together form a plurality of porous regions, or zones, corresponding to respective amounts of cooling flow. Referring initially to FIG. 9, there is shown a flattened out arc portion of the inner variable porosity combustor liner 120 in which the top and bottom of FIG. 9 represent respectively the axially aft (AFT) and forward (FWD) ends of the arc portion. The arc portion can comprise any portion of the inner combustor liner 120; in the illustrative embodiment the arc portion is a 180 degree arc portion of the inner combustor liner 120. In one form, the arc portion, which in FIG. 9 has a curved "banana" shape, can comprise all or part of a frustoconical portion 122 (FIG. 2)

of the inner combustor liner 42 of the annular variable porosity Lamilloy combustor liner 30. As will be appreciated, a rectangular arc portion can comprise a cylindrical portion of the inner combustor liner 42.

As shown in FIG. 9, there are three different porous regions indicated respectively by the reference numerals 130, 132, and 134, where each region has an associated identifying line pattern corresponding to an amount of cooling flow, or porosity, at that particular region of the variable porosity Lamilloy combustor liner 120. Generally, the porous region 132 is an aft region, the porous region 134 is a forward region, and the porous region 130 is an intermediate region disposed between the forward and aft regions 134, 132. The intermediate porous region 130 is indicated by a diagonal line pattern, and extends circumferentially across the middle of the arc portion. In addition, the intermediate porous region 130 extends in the aft direction as rearward pointing triangular portions and in the forward direction as slightly smaller forward pointing triangular portions. The aft porous region 132 is indicated by a horizontal line pattern and extends circumferentially across the aft portion of the arc portion in the form of forward pointing triangular portions. The forward pointing triangular portions of the aft porous region 132 lie adjacent to the rearward pointing triangular portions of the intermediate porous region 130. The forward porous region 134 is indicated by a crossed line pattern and extends circumferentially across the forward portion of the arc portion and also in the aft direction as rearward pointing triangular portions. The rearward pointing triangular portions of the forward porous region 134 lie adjacent to the forward pointing triangular portions of the intermediate porous region 130.

Figure 10:
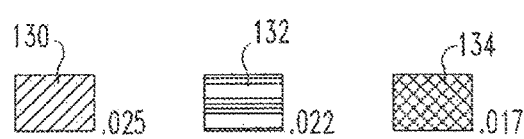
FIG. 10 shows legends identifying the hole diameters of the holes of the respective zones of the FIG. 9 inner variable porosity laminated alloy combustor liner.

Referring to FIG. 10, in one form, different cooling flow amounts can be provided in the different porous regions 130, 132, and 134 of the FIG. 9 arc portion of the inner Lamilloy combustor liner 120 by providing different diameter holes in the inner and outer sheets, or walls, 100, 102 of the different regions 130, 132, and 134. For example, hot side holes 110 and cold side holes 112 in the respective inner and outer walls 100, 102 of the FIG. 9 inner combustor liner 120 can have a first diameter (e.g. 0.025 inch) in the intermediate porous region 130, a second diameter (e.g. 0.022 inch) in the aft porous region 132, and a third diameter (e.g. 0.017 inch) in the forward porous region 134. Based on the hole diameters in the respective porous regions 130, 132, 134, the aft porous region 132 can have a relatively higher amount of cooling flow than the forward porous region 134, and the intermediate porous region 130 can have a relatively higher amount of cooling flow than the forward porous region 132 and the aft porous region 134.

FIG. 11 illustrates another embodiment of an inner variable porosity Lamilloy combustor liner 140 having different cooling flow amounts, or porosities, at respective different porous regions 150, 152, 154 of the inner combustor liner 140. FIG. 11 shows a flattened out arc portion of the inner combustor liner 140 in which the top and bottom of FIG. 11 represent respectively the axially aft (AFT) and forward (FWD) ends of the arc portion. The arc portion can comprise any portion of the inner combustor liner 140; in the illustrative embodiment the arc portion is a 180 degree arc portion of the inner combustor liner 140. In one form, as with the FIG. 9 arc portion, the FIG. 11 arc portion, which has a curved "banana" shape, can comprise all or part of a frustoconical portion 122 (FIG. 2) of the inner combustor liner 42 of the annular variable porosity Lamilloy combustor liner 30. As will be appreciated, a rectangular arc portion can comprise a cylindrical portion of the inner combustor liner 42. Generally, the porous region 154 is a forward region, and the porous regions 150 and 152 are circumferentially distributed axial regions, the forward ends of which lie adjacent to the forward region 154. The forward porous region 154 is indicated by a crossed line pattern and extends circumferentially across the forward portion of the arc portion. The axial porous region 150 is indicated by a diagonal line pattern and the axial porous region 152 is indicated by a horizontal line pattern. The axial porous regions 150 and 152 extend axially rearward from the forward porous region 154 to the aft end of the arc portion, and circumferentially across the arc portion in an alternating manner.

Figure 12:
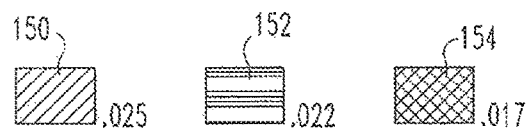
FIG. 12 shows legends identifying the hole diameters of the holes of the respective zones of the FIG. 11 inner variable porosity laminated alloy combustor liner.

Referring to FIG. 12, in one form, different cooling flow amounts can be provided in the different porous regions 150, 152, and 154 of the FIG. 11 arc portion of the inner Lamilloy combustor liner 140 by providing different diameter holes in the inner and outer walls, or sheets, 100, 102 of the different regions 150, 152, and 154. For example, hot side holes 110 and cold side holes 112 in the respective inner and outer walls 100, 102 of the FIG. 11 inner combustor liner 140 can have a first diameter (e.g. 0.025 inch) in the axial porous region 150, a second diameter (e.g. 0.022 inch) in the axial porous region 152, and a third diameter (e.g. 0.017 inch) in the forward porous region 154. Based on the hole diameters in the respective porous regions 150, 152, 154, the forward region can have a relatively higher amount of cooling flow than the axial porous regions 150, 152, and the axial porous region 150 can have a relatively higher amount of cooling flow than the axial porous region 152.

In the FIG. 9 and FIG. 11 embodiments, the inner and outer walls 100, 102 are described as having the same arrangement of porous regions and the same hole diameters in the respective porous regions. The combustor liner 30 need not be limited as such, and other embodiments are contemplated. The inner and outer walls 100, 102 can each have their own arrangement of porous regions incorporated therein, and the arrangements can be the same in the inner and outer walls 100, 102, as in the illustrative embodiment, or different in the inner and outer walls 100, 102. Further, although the arrangements of the porous regions may be the same in the inner and outer walls 100, 102, the cooling flow amounts of the porous regions of the arrangements may be different. It will be appreciated that the hot side holes 110 and the cold side holes 112 in the respective inner and outer walls 100, 102 may be different in shape, size, and/or configuration in the inner wall 100 and the outer wall 102, and/or among the different porous regions in a given wall 100, 102.

FIGS. 9 and 11 show two different arrangements of porous regions in an inner variable porosity laminated layer combustor liner 120, 140, either of which can be used for example in the inner combustor liner 42 shown in FIG. 2. As will be appreciated, the embodiments of FIGS. 9 and 11 are merely illustrative of the numerous types of arrangements of porous regions that can be tailored to a cooling requirement by the incorporation of holes and fluid flow passages in the sheets of metal alloy that form the laminated alloy combustor liner 30. The present application is not limited to any particular arrangement of porous regions, it being understood that the arrangement can be based on the particular application of the Lamilloy combustor liner 30 and the particular application of the gas turbine engine 10 of which it is a part.

The arrangement of multiple porous regions can be based on, for example, the proximity of the porous region to other components of the combustion section 16, such as the dome inlet module 38, the fuel injector assembly 54, the swirler assembly 58, and/or the igniter assembly 60. Additionally and/or alternatively, multiple porous regions can be arranged based on the proximity of the porous region to cooling holes or passages that provide cooling air to the combustion chamber 44, for example, the primary holes 80, 82, and/or the dilution holes 90, 92, described with respect to the variable porosity Lamilloy combustor liner 30 of FIG. 2. In one form, for example, multiple different porous regions having respective cooling flow amounts can be arranged in an alternating manner circumferentially about the axis 32 based on the manner by which the primary holes 80, 82 (and/or dilution holes 90, 92) are arranged circumferentially about the axis 32. In one form, the porous regions can be arranged for example based on the proximity in the axial direction of the porous region to the upstream compressor section 14 or the downstream turbine section 18.

In the embodiments of FIGS. 9 and 11, the inner variable porosity laminated alloy combustor liners 120, 140 each have different porous regions having respective different porosities, that is different fluid flow amounts, based on different hole diameters in the respective porous regions. As will be appreciated, the variable porosity in the laminated alloy combustor liner 30, whether the outer or inner combustor liner 40, 42, need not be limited to being based on different hole diameters in the respective porous regions of the combustor liner 30. The variable porosity in the outer laminated alloy combustor liner 40 and/or the inner laminated alloy combustor liner 42, can be based on other or additional parameters, as will be appreciated.

For example, the porous regions can have different cooling flow amounts and/or other flow characteristics based on the quantity, shape, size and/or distribution of the hot side holes 110 and cold side holes 112, or the quantity, shape, size and/or distribution of the pedestals 118 of the cold side wall 102.

Figure 13:
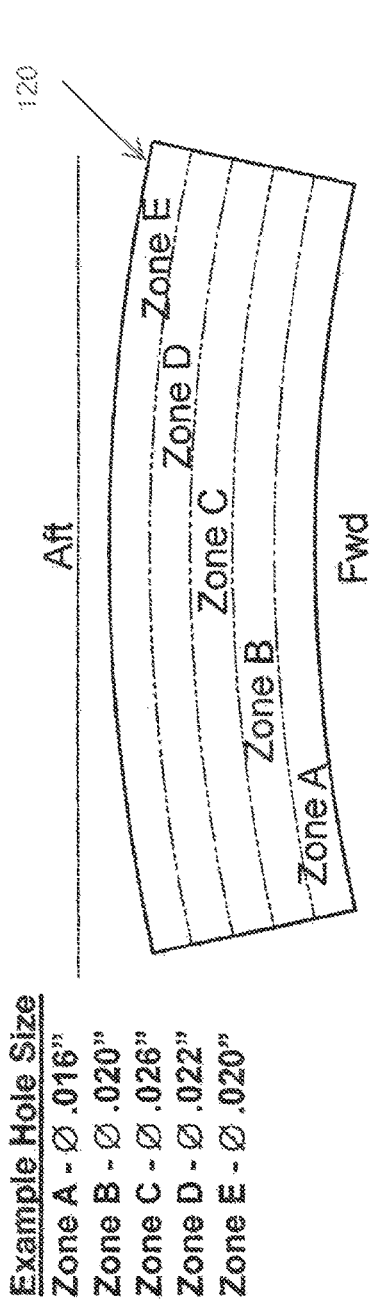
FIG. 13 shows an embodiment of an inner liner Lamilloy sheet having zones A, B, C, D, E, axially FWD to AFT, of variable hole size.
Figure 14:
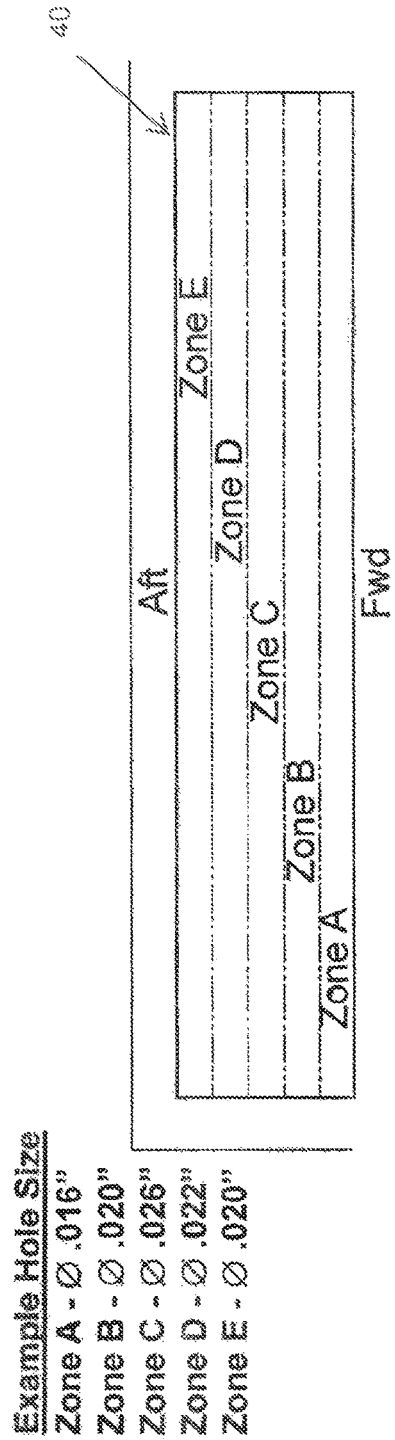
FIG. 14 shows an embodiment of an outer liner Lamilloy sheet having zones A, B, C, D, E, axially FWD to AFT, of variable hole size.

FIG. 13 shows an embodiment of an inner liner Lamilloy sheet, corresponding with combustor liner 120 of FIG. 9 and in an alternative arrangement, having zones A, B, C, D, E, axially FWD to AFT, of variable hole size. FIG. 14 shows an embodiment of an outer liner Lamilloy sheet, corresponding with outer combustor liner 40 of FIG. 2 and in an alternative arrangement, having zones A, B, C, D, E, axially FWD to AFT, of variable hole size. In the FIGS. 13 and 14 embodiments, the cold side sheet and hot side sheet have matching hole sizes and zones. It will be appreciated that the cold side and hot side zones need not necessarily match hole sizes and zones.

Referring now again to FIGS. 3 and 4, a method of manufacturing the combustor liner 30 having porous regions incorporated therein according to an embodiment will now be described. The manufacturing process can be performed according to any suitable method including for example Lamilloy sheet manufacturing methods, or casting and direct metal laser sintering (DMLS). Initially, inner and outer (hot and cold side) metal alloy sheets 100, 102 are provided. Cooling flow passages 114, including the formation of pedestals 118, are electrochemically etched into the cold side metal alloy sheet 102. Hot side holes 110 and cold side holes 112 are laser drilled into the respective hot side and cold side metal alloy sheets 100, 102. The cooling pattern provided by the hot side and cold side holes 110, 112, and the flow passages 114, can be repeated as often as is needed to form a particular porous region in the combustor liner 30 to a desired axial length and circumferential span. The cooling flow amounts and the arrangement of different porous regions can be tailored according to the cooling requirements of the combustor liner 30. The hot side sheet 100 and the cold side sheet 102 are then diffusion bonded together into a two ply Lamilloy sheet assembly.

Once the Lamilloy sheets have been diffusion bonded together, the material can be cut out using a laser cutting process. Referring to FIG. 2, an inner variable porosity Lamilloy combustor liner 42 can be formed by laser cutting a curved "banana" shape piece from the two ply Lamilloy sheet assembly, and then rolling and welding the cut piece into a frustoconical shape part, for example the portion 122 of the inner variable porosity Lamilloy combustor liner 42 shown in FIG. 2. An outer variable porosity Lamilloy combustor liner 40 can be formed by laser cutting a rectangular shape piece from a two ply Lamilloy sheet assembly, and then rolling and welding the cut piece into a cylindrical shape part, for example all or part of the outer variable porosity Lamilloy combustor liner 42 shown in FIG. 2. In one form, the conical inner liner 42 and the cylindrical outer liner 40 can be placed in an expander machine to stretch the Lamilloy liners into a desired shape combustor liner 30.

Although the present application describes combustor liners 30 comprising inner and outer sheets, that is a two ply Lamilloy sheet assembly, the combustor liner 30 need not be limited as such. As will be appreciated, the inner and outer Lamilloy liners 42, 40 of the combustor liner 30 can comprise any number of metal alloy sheets to form the liner. In one form, for example, a liner can comprise three stacked and diffusion bonded metal alloy sheets. Such a three ply Lamilloy sheet assembly can include for example an innermost sheet that faces the combustion chamber and has hot side through holes, an intermediate sheet that has intermediate through holes and flow passages, and an outermost sheet that faces the cooling air plenum and has cold side holes and flow passages. Other embodiments are also contemplated.

As will be appreciated, the variable porosity laminated alloy combustor liner 30 features a cooling flow arrangement that can be tailored to specific cooling design requirements of a combustor liner 30. The combustor liner 30 is fabricated from flat Lamilloy sheet material, so the variable cooling flow requirements can be incorporated in the sheet material before it is formed into either an outer combustor liner 40 or an inner combustor liner 42 of the combustor liner 30. The variable porosity Lamilloy incorporates the cooling flow requirements into the flat sheet design and the fabrication of the sheet material, including incorporation of the cooling flow configuration. The variable porosity Lamilloy inner combustor liner 42 enables a tailored cooling flow arrangement to be achieved. FIGS. 9 and 11 show merely two different arrangements and configurations.

The tailored cooling flow design can place more cooling flow in areas where the combustor liner 30 is at greater risk for damage due to, for example, elevated temperatures. The cooling flow can be obtained by reducing the flow in areas where less cooling flow is required by the combustor liner 30. Consequently, the tailored cooling flow arrangement can be realized with no net increase in the amount of cooling flow that is required by the combustor liner 30.

The variable porosity laminated alloy combustor liner 30 can be implemented for annular combustor liners, as described herein. The variable cooling flows can be incorporated by way of plural porous regions, in which the porous regions include varying cooling hole diameters manufactured for example during a laser hole drilling process. The cooling hole sizes can be varied in the annular combustor liner 30 in a uni-directional arrangement, for example axially, or in a bi-directional arrangement, for example axially and circumferentially.

Any theory, mechanism of operation, proof, or finding stated herein is meant to further enhance understanding of embodiment of the present invention and is not intended to make the present invention in any way dependent upon such theory, mechanism of operation, proof, or finding. In reading the claims, it is intended that when words such as "a," "an," "at least one," or "at least one portion" are used there is no intention to limit the claim to only one item unless specifically stated to the contrary in the claim. Further, when the language "at least a portion" and/or "a portion" is used the item can include a portion and/or the entire item unless specifically stated to the contrary.

While embodiments of the invention have been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein of by any of the following claims are desired to be protected. It should also be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow.

The invention claimed is:

1. A combustor liner extending from a forward position to an aft position with respect to a gas turbine, comprising:
    an outer wall extending from the forward position to the aft position and having a plurality of cold side holes projecting through the outer wall; and
    an inner wall extending from the forward position to the aft position and having a plurality of hot side holes facing a combustion chamber of the gas turbine, the plurality of hot side holes projecting through the inner wall;
    wherein at least one of the plurality of cold side holes or the plurality of hot side holes includes a first region of holes having a first diameter, and a second region of holes having a second diameter that is different from the first diameter; and
    wherein all of the first region of holes are positioned forward of all the second region of holes;
    wherein:
        the second diameter is greater than the first diameter;
        the at least one of the plurality of cold side holes or the plurality of hot side holes includes a third region of holes having a third diameter that is different from the first and second diameters;
        the third diameter is greater than both the first diameter and the second diameter; and
        the third region of holes is positioned between the first region of holes and the second region of holes.

2. The combustor liner of claim 1, wherein the outer wall and the inner wall each include the first region of holes, the second region of holes, and the third region of holes, and wherein the outer wall and the inner wall having matching hole sizes and regions.

3. A method of forming a combustor liner extending from forward position to aft positions that are defined with respect to a gas turbine, comprising:
    forming an outer wall that extends from the forward position to the aft position and includes a plurality of cold side holes projecting through the outer wall; and
    forming an inner wall that extends from the forward position to the aft position and includes a plurality of hot side holes facing a combustion chamber of the gas turbine, the plurality of hot side holes projecting through the inner wall;
    wherein:
        one of the plurality of cold side holes or the plurality of hot side holes includes a first region of holes having a first diameter, and a second region of holes having a second diameter that is different from the first diameter;
        all of the first region of holes are positioned forward of all the second region of holes;
        the second diameter is greater than the first diameter;
        the one of the plurality of cold side holes or the plurality of hot side holes includes a third region of holes having a third diameter that is different from the first and second diameters;
        the third diameter is greater than both the first diameter and the second diameter; and
        the third region of holes is positioned between the first region of holes and the second region of holes.

4. The method of claim 3, wherein the outer wall and the inner wall each include the first region of holes, the second region of holes, and the third region of holes, and wherein the outer wall and the inner wall having matching hole sizes and regions.

5. A combustor, comprising:
    an outer wall extending from a forward position to an aft position of the combustor, the outer wall having cold side holes projecting through the outer wall; and
    an inner wall extending from the forward position to the aft position and having hot side holes facing a combustion chamber of the combustor, the hot side holes projecting through the inner wall;
    wherein:
        one of the cold side holes or the hot side holes includes a first region of holes having a first diameter, and a second region of holes having a second diameter that is different from the first diameter;
        all of the first region of holes are positioned forward of all the second region of holes;
        the second diameter is greater than the first diameter;
        one of the cold side holes or the hot side holes includes a third region of holes;
        the third region of holes have a third diameter that is greater than both the first diameter and the second diameter;
        the third region of holes is positioned between the first region of holes and the second region of holes;
        the outer wall and the inner wall each include the first region of holes, the second region of holes, and the third region of holes; and
        the outer wall and the inner wall having matching hole sizes and regions.

6. A combustor liner extending from a forward position to an aft position with respect to a gas turbine, comprising:
    an outer wall extending from the forward position to the aft position and having a plurality of cold side holes projecting through the outer wall; and
    an inner wall extending from the forward position to the aft position and having a plurality of hot side holes facing a combustion chamber of the gas turbine, the plurality of hot side holes projecting through the inner wall;
    wherein at least one of the plurality of cold side holes or the plurality of hot side holes includes a first region of holes having a first diameter, and a second region of holes having a second diameter that is different from the first diameter; and wherein all of the first region of holes are positioned forward of all the second region of holes;

wherein:

the second diameter is greater than the first diameter;

the at least one of the plurality of cold side holes or the plurality of hot side holes includes a third region of holes having a third diameter that is different from the first and second diameters;

the third diameter is greater than both the first diameter and the second diameter; and all of the first region of holes are positioned forward of the entire third region of holes.

7. The combustor liner of claim 6, wherein the second and third regions of holes are circumferentially distributed regions about a circumference of the combustor liner, forward ends of which lie adjacent to the first region, the second and third regions extending axially rearward from the first region, and circumferentially across an arc portion in an alternating manner of the second and third regions.

8. A method of forming a combustor liner extending from forward position to aft positions that are defined with respect to a gas turbine, comprising:

forming an outer wall that extends from the forward position to the aft position and includes a plurality of cold side holes projecting through the outer wall; and forming an inner wall that extends from the forward position to the aft position and includes a plurality of hot side holes facing a combustion chamber of the gas turbine, the plurality of hot side holes projecting through the inner wall;

wherein:

one of the plurality of cold side holes or the plurality of hot side holes includes a first region of holes having a first diameter, and a second region of holes having a second diameter that is different from the first diameter;

all of the first region of holes are positioned forward of all the second region of holes;

the second diameter is greater than the first diameter;

the one of the plurality of cold side holes or the plurality of hot side holes includes a third region of holes having a third diameter that is different from the first and second diameters;

the third diameter is greater than both the first diameter and the second diameter; and all of the first region of holes are positioned forward of the entire third region of holes.

9. The method of claim 8, wherein the second and third regions of holes are circumferentially distributed axial regions about a circumference of the combustor liner, forward ends of which lie adjacent to the first region, the second and third regions extending axially rearward from the first region, and circumferentially across an arc portion in an alternating manner of the second and third regions.

10. A combustor, comprising:

an outer wall extending from a forward position to an aft position of the combustor, the outer wall having cold side holes projecting through the outer wall; and an inner wall extending from the forward position to the aft position and having hot side holes facing a combustion chamber of the combustor, the hot side holes projecting through the inner wall;

wherein:

one of the cold side holes or the hot side holes includes a first region of holes having a first diameter, and a second region of holes having a second diameter that is different from the first diameter;

all of the first region of holes are positioned forward of all the second region of holes;

the second diameter is greater than the first diameter;

one of the cold side holes or the hot side holes includes a third region of holes;

the third region of holes have a third diameter that is greater than both the first diameter and the second diameter;

all of the first region of holes are positioned forward of all of the third region of holes; and the second and third regions of holes are circumferentially distributed axial regions, forward ends of which lie adjacent to the first region, the second and third regions extending axially rearward from the first region, and circumferentially across an arc portion in an alternating manner of the second and third regions.

* * * * *